United States Patent [19]

Smith, Jr. et al.

[11] Patent Number: 4,717,825

[45] Date of Patent: Jan. 5, 1988

[54] METHOD AND APPARATUS FOR ANOMALOUS RADIOACTIVE DEPOSITION COMPENSATION IN SPECTRAL GAMMA RAY WELL LOGGING

[75] Inventors: Harry D. Smith, Jr.; Larry L. Gadeken, both of Houston, Tex.

[73] Assignee: Halliburton Company, Duncan, Okla.

[21] Appl. No.: 888,602

[22] Filed: Jul. 23, 1986

[51] Int. Cl.⁴ .............................................. G01V 5/00
[52] U.S. Cl. .................................... 250/256; 250/262
[58] Field of Search ........................ 250/253, 256, 262

[56] References Cited

U.S. PATENT DOCUMENTS

| | | | |
|---|---|---|---|
| 4,439,676 | 3/1984 | Smith, Jr. et al. | 250/256 |
| 4,527,058 | 7/1985 | Smith, Jr. | 250/262 |
| 4,612,439 | 9/1986 | Chace | 250/256 |
| 4,661,701 | 4/1987 | Grau | 250/262 |

Primary Examiner—Janice A. Howell
Attorney, Agent, or Firm—William J. Beard

[57] ABSTRACT

A method and apparatus (108) are disclosed for spectral gamma ray logging of a well borehole (106) to determine elemental concentrations of radioactive materials in subsurface earth formations (100) and in the borehole region. Anomalous radioactive deposition in the borehole region is identified and the effect thereof compensated for in the elemental concentration determinations.

60 Claims, 7 Drawing Figures

METHOD AND APPARATUS FOR ANOMALOUS RADIOACTIVE DEPOSITION COMPENSATION IN SPECTRAL GAMMA RAY WELL LOGGING

FIELD OF THE INVENTION

This invention relates to spectral gamma ray logging of earth formations traversed by a borehole. More particularly, the invention concerns detection of the presence and location of radioactive material deposition in the borehole region, as well as corrections for such deposition in the determination of elemental concentrations within the formation.

BACKGROUND OF THE INVENTION

The concentrations of radioactive isotopes of elements such as potassium, uranium, and thorium (K-U-T respectively) in subsurface earth formations provide valuable geophysical and petrophysical information regarding subsurface earth formations.

One method for obtaining such concentrations is known particularly as gamma ray energy spectroscopy logging. In accordance with such a method, energy spectra of gamma rays from the formation are derived as a function of borehole depth by means of a logging instrument suspended within a borehole and made to traverse the formations of interest.

More particularly, as the logging tool is raised up the borehole apparatus within the instrument detects gamma photons from the formation incident thereupon and measures the corresponding energies of such photons. A plurality of composite total observed energy spectra are thence electonically defined. Each spectrum corresponds to a different increment or location along the borehole. Each spectrum is comprised of count rates of such gamma photons detected within each of a plurality of successively adjacent discrete energy ranges or windows while the instrument is positioned at or traverses the particular borehole increment.

Each radioactive element distributed in the formation will give rise to and be associated with a unique elemental gamma ray spectrum. The spectral shape and magnitude of each element's spectrum measured in the tool is dependent upon the concentration of the particular element in the formation and borehole variables including borehole diameter, mud weight, diameter and weight of casing, and density of material in the casing-borehole annulus with respect to cased boreholes. Each composite observed total gamma ray energy spectrum may be considered as a linear combination of such individual elemental energy spectra for the different radioactive elements in the formation.

Test formations with known K-U-T elemental concentrations have been employed to generate a plurality of reference elemental energy spectra. Each such reference spectrum has a characteristic shape and magnitude corresponding to a known concentration of the element and standard borehole conditions. Techniques, also based on test pit data, have further been developed for modifying these reference energy spectra as a function of the particular non-standard borehole conditions encountered in the field.

More particularly, the attenntuating and downscattering effects of the particular borehole conditioins on the detected gamma ray energies is modeled by means of a borehole compensation variable known in the literature as L. The variable, being related to the density and thickness of borehole materials, will accordingly reflect the amount and character of the borehole materials between the elemental sources of radioactivity in the formation and the gamma rays detected in the tool.

By several methods known in the art (such as a weighted least squares fitting algorithm), various combinations of these borehole compensated reference spectra are selected to minimize the fit error between the combinations of elemental spectra attempted and the composite total observed energy spectrum or gamma ray log measured by the logging instrument. It may be inferred that the elemental concentrations corresponding to each reference spectrum of the particular combination with minimizes the error represent the elemental concentrations in the formation being measured.

It will be recalled that the borehole compensation variable serves to model the effects of borehole materials between the radioactive source in the formation and the detector in the tool through which the detected gamma rays must pass. The variable employed assumes a similar uniform distribution of all the naturally radioactive elements in the formation. It is assumed that all measured gamma rays must travel through and accordingly be attenuated by the same borehole materials, and thus the same borehole compensation variable operates on all elementa reference spectra.

A more detailed discussion of the previously described technique and principles of multi-function compensated spectral gamma ray logging systems may be found in U.S. Pat. No. 4,527,058 entitled "Earth Formation Density Measurement from Natural Gamma Ray Spectral Logs"; "Applications of the Compensated Spectral Natural Gamma Tool" by Gadeken, et al, Transactions of SPWLA 25th Annual Logging Symposium (June 10–13, 1984); and "A Multi-function Compensated Spectral Natural Gamma Ray Logging System", by Smith et al, SPE Paper No. 12050 presented at the 58th Annual Technical Conference, San Francisco, Cal. October, 1983, such references being herein incorporated by reference.

The assumption of substantially homogeneously distributed radioactive sources in earth formations is normally justified in practice. However, situations arise wherein non-uniform source distributions are encountered giving rise to many problems hereinafter enumerated.

As but one example, it is known in the art that subsurface water can serve as a transport medium for uranium or radium salts. Given appropriate flow conditions for such fluid, this can give rise to deposition of radioactive materials in and around the vicinity of the borehole region. More particularly, in practice such material has been found preferentially deposited and concentrated in locations at varying distances radially outwards of and proximate to the borehole center.

For example, such deposits have been found plated in or on formation fractures adjacent the borehole. With respect to cased boreholes, concentrations of radioactive material have further been found on the inside surface of the casing wherein apertures in the casing wall have permitted flow of material (as from corrosion, perforations, or the like).

Also regarding cased boreholes, radioactive elements have further been observed on the outer surface of the casing. Where the casing has been cemented, such depositions or plating are also found radially outwards of the casing at varying locations in the cement annulus between the casing and borehole wall (due to fingering or channeling or the like) and on the outer surface of the cement at the cement-borehole interface.

From the foregoing, it will be appreciated that when deposition of radioactive material occurs non-homogeneously in the borehole region (usually uranium or radium salts), the above-noted borehole attenuation properties operating on the element's spectrum will not be accurately modeled by the conventional borehole compensation variable. Uranium gammas will be less attenuated than those of potassium and thorium, for example, since they will pass through less material. Yet the same borehole compensation variable is being employed in determination of all elemental concentrations.

However, this does not result only in erroneous determination of elemental concentrations of the deposited elemen such as uranium. It will be recalled that elemental concentrations of a plurality of elements such as K, U, and T are determined by combinations of borehole-compensated reference spectra for such elements and that such a combination is sought which minimizes the fit error to the composite spectrum observed. Thus, error in properly modeling and characterizing the contribution of the uranium deposition to the total spectrum gives rise to error in the concentration determinations of the remaining elements such as K and T which also contribute to the observed composite spectrum.

Yet other problems are associated with anomalous radioactive deposition in the vicinity of the borehole. As previously noted, the shape and magnitude of the composite total observed energy spectrum is affected by the amount and type of material through which the detected gamma rays have traveled, whether due to formation lithological properties, casing, cement, and/or borehole material. More particularly, in an energy window of 25-150 Kev, for example, this material causes pronounced in photoelectric absorption of gamma rays and resultant effects the spectrum. The gamma ray count rates of a spectrum in this low energy window region are sensitive as indicators of absorption, particularly by the high atomic number elements in the lithology, casing and the like than are count rates in a high energy window of, for example, 175-325 Kev wherein Compton scattering effects dominate.

Accordingly, photoelectric ratios (i.e. ratios comprised of a count rate in the high and low energy window, such as casing and lithology ratios $R_c$ and $R_{lith}$, respectively), as well as their variations with borehoole depth have thus been used as casing thickness and lightology indicators.

Inasmuch as observed spectral shapes are a function of the material between the radioactive source distributed in the formation and the detector, they as well as the photoelectric functions resultant therefrom will thus be a function of the source distance from the detector and the density and atomic number of the intervening material. In conventional determinations and interpretations of the aforementioned photoelectric ratio functions, uniform homogeneous K-U-T source distributions in the formation are assumed.

However, when spectral changes and attendant photoelectric ratio changes are due to changes in the source-detector separation or changes in the intervening material (as, for example, when anomalous radioactive deposition or plating in the borehole region is encountered), this may be erroneously interpreted as changes in lithology, casing thickness, or elemental concentrations out in the formation. If, however, it is known that such a deposition situation exists from a number of indicators hereinafter discussed in greater detail, it will be appreciated that these variations in the photoelectric ratios alone, or in combination with other parameters, could be used to indicate whether the source is inside the casing or the radial distance of such depositions from the detector.

This information, in turn, could be used for several purposes also hereinafter discussed. These might include indication of damaged casing or which of a plurality of perforated zones are producing water and/or hydrocarbons (from plating detected on the inner surface of the casing), cement channels, leaks in tubular goods, fractures, and the like.

As an example of prior attempts to detect such depositional activity, total gamma ray count rates from a current log have been compared to those of a historical log run at the same or an adjacent well site. When the current count rates exceeded those of the historical log by more than a predetermined amount (which accounted for statistical variance and variance from normal elemental concentrations out in the formation), then it was assumed that this excess count rate was attributable to radioactive depositions in the vicinity of the borehole.

Such methods did not attempt to compensate for these variations in source distance or position (with respect to the casing) from the detector in determination of elemental concentrations. Nor was there a provision for characterizing the location of these radioactive depositions as being, for example, plated onto the innermost casing surface or the outer casing surface, in cement channels, on the outer surface of the cement, on fractures near the borehole, or combinations thereof.

In summary, then, it will be appreciated from the foregoing that a need has long existed to provide a more accurate determination of elemental concentrations in the formation which accounted for anomalous radioactive depositions in the borehole regions. Still further, however, the need has also long existed for methods and apparatus for determining the presence and location of such anomalous radioactive depositions in the borehole region for various reasons hereinafter discussed.

SUMMARY OF THE INVENTION

An energy spectral gamma ray log of subsurface earth formations as a function of depth is produced employing a gamma ray logging tool. The log is comprised of a plurality of spectra each derived from and corresponding to a different depth or increment of borehole. A condition of anomalous deposition of uranium in the vicinity of the borehole is detected as a function of one or more indicators. The indicators include (1) anomalous $R_c$ photoelectric ratios from the log; (2) comparison of a current K-U-T total gamma ray count rate log with that of a historical such log; (3) magnitude of error in a residual fitting error function measuring the difference between a total observed gamma ray count rate spectrum uncompensated for borehole effects and the calculated gamma ray total count rate spectrum reconstructed from borehole-compensated calculated formation elemental concentrations; and (4) field knowledge of the depths of perforated intervals and zones of water injection or production.

If such anomalous uranium deposition is detected, in one embodiment a single preselected reference gamma ray energy spectrum is derived corresponding to uranium deposited in the borehole region, both inside and outside any casing that is preseny. In a second embodiment, a reference gamma ray energy spectrum is derived corresponding to measurement within a test casing of a source of first radioactive material such as uranium disposed inside the casing. At least one second reference gamma ray energy spectrum is derived of the first material corresponding to measurement within a test casing of the source when disposed radially outwards of the casing at a distance d. These two reference spectra are combined to form a composite uranium reference spectra.

In yet another embodiment, a plurality of such second spectra are derived each corresponding to positioning of the source at a different preselected radially outward location and distance d, such as one the outer casing surface, within a cement layer surrounding the casing and/or on the outer cement surface. The sources may take the form, in one embodiment, of cylindrical uranium sleeves of varying diameters whereby they may be disposed within or about the test casing for measurement of each respective reference spectrum.

Reference gamma ray energy spectra are also derived corresponding to a known concentrations of second and third radioactive materials such as potassium and thorium, and also uranium, evenly distributed within a formation outside the borehole. Thus, the materials are modeled as they appear in field conditions as point sources uniformly distributed in a homogeneous formation medium, and not as anomalous deposition in the borehole region, which the aforementioned spectra for the first material models. If no anomalous deposition is detected, the K-U-T concentrations are determined using the conventional techniques, assuming all these elements are uniformly distributed in the formation.

A set of sensitivity matrix elements of a sensitivity matrix A is derived for each said reference spectrum. For a given spectrum and corresponding radioactive material j (such as j=K, U, Th), each matrix element is of the form $A_{ij}$ where i=the count rate of gamma rays in the $i^{th}$ energy window of the spectrum per unit of material j(i.e. tool sensitivity for standard conditions).

These sensitivity matrix elements may be borehole-compensated for the effects of the non-standard measurement borehole and materials therein on the detected gamma rays giving rise to the tool-generated spectrum, e.g. they are adjusted to compensate for the fact that they were generated under non-standard borehole conditions. Accordingly, each matrix element will have the form:

$$A'_{ij} = A_{ij} F_{ij}(L) \qquad \text{Equation 1}$$

to account for non-standard borehole conditions encountered in the field where:
 $F_{ij}$=factors by which the sensitivity matrix elements are changed to compensate for scattering and absorption effects in the borehole
 L=borehole compensation variable proportional to the attenuation cross-section of the materials in the borehole A value functionally related to the casing ratio $R_c$ is determined for each uranium reference spectrum. More particularly a value x is determined functionally related to $R_c$ from the spectrum derived from the uranium standard source inside the casing. A value y is determined functionally related to $R_c$ from each reference uranium spectrum derived from the uranium source located at least on the outer casing surface or radially outwards therefrom. A casing ratio $R_c$ is also determined from each observed field spectrum derived by the tool.

If anomalous uranium deposition is detected from the aforesaid criteria (which may include $R_c$ of the field spectrum=x or y), it may thus be further assumed that the value for $R_c$ measured from the formation gamma ray log will strongly reflect this. It may also be assumed that the uranium borehole spectrum will dominate the formation uranium spectrum.

One or more of the following factors will indicate uranium deposition inside the casing: (1) a reduced photoelectric absorption from the decrease in material (which may include absence of casing) through which the gammas must pass and (2) presence of a uranium K x-ray in the photoelectric spectral region. Accordingly if the $R_c$ from a field spectrum derived at a given borehole elevation approximates the $R_c$ from the reference spectrum modeling uranium deposition inside the casing (i.e. if $R_c$ approximately equals x) uranium deposition inside the casing is assumed at that elevation. The reference spectral shape for uranium deposited inside the casing only ($D_i$) and corresponding U matrix element set $A'_{iu}$ will be employed in determination of elemental concentrations $M_{k,u,t}$ from the matrix relationship C=A'M.

The respective K-U-T elemental concentrations are calculated from the aforesaid C=AM matrix relationship utilizing the elements of the sensitivity matrix A and particularly those $A_i$ elements for uranium selected as aforesaid as a function of $R_c$ and alpha.

The function alpha=$f(x,y,R_c)$ is derived which may be of the linear form:

$$\alpha = (R_c - x)/(y - x) \qquad \text{Equation 2}$$

where, for $R_c = x$
 $\alpha = 0$ (indicating $D_i$, deposition exclusively inside casing), and
for $R_c = y$
 $\alpha = 1$ (indicating $D_o$, deposition exclusively outside the casing in the borehole region.)

In the case where $R_c$ and alpha are between x and y and between 0 and 1, respectively, it may be assumed that anomalous uranium deposition ($D_{i/o}$) is distributed in the borehole region both inside and outside the casing in the proportions of alpha and (1 - alpha), respectively.

More particularly, these concentrations M are preferably determined from the method of weighted least squares from the relationship:

$$M = (A^T W A)^{-1} A^T W C \qquad \text{Eq. 3}$$

where T is a transpose, -1 is the inverse, and the elements of the matrices C, M, and W are given by:
 $C_i$=count rate in window i of the field spectrum (i=1,...,m)
 where m=10-13 preferably, depending on borehole conditions,
 $M_j$=concentration of element j where j=K,U,T; and
 $W_{ij}$=weights ($W_{i \ne j}=0$, $W_{i=j}=k/C_i$, where K is a constant depending on logging speed.)

It has been noted that the spectral shape and thus the sensitivity matrix elements assumed for uranium can be selected as a function of deposition location from the value of $R_c$ and hence alpha. The U-matrix elements can also be selected employing a nominal borehole uranium spectrum, eliminating the requirement to use $R_c$. These U-matrix elements will differ from the A' matrix elements employed for potassium and thorium. The process for determining the elemental concentration can terminate here, or can be refined using the following procedure.

It will also be recalled that a plurality of uranium reference spectra may be measured, each corresponding to deposition at different radial distances outside the casing adjacent the borehole (such as on the outer surface of the casing or cement or in the cement). In such cases determination of elemental concentrations $M_{k,u,t}$ noted above will employ the A' matrix elements for one of those uranium spectral when deposition radially outwards of the casing is indicated.

A normalized fitting error, e, is then computed as defined by the relationship:

$$e = \left[1 - \frac{\Sigma_{i,j} A'_{i,j} M_j}{\Sigma_i C_i}\right]^{\frac{1}{2}} \quad \text{Eq. 4}$$

The fit error measures accuracy of fit of combinations of calculated reference gamma ray log spectra reconstructed from the compensated elemental concentrations as hereinabove calculated to the observed (uncompensated) total gamma count spectrum.

A next determination of K-U-T elemental concentrations $M_j$ may be made when a plurality of uranium reference spectra corresponding to uranium sources at differing radial distances outside the casing are available. Sensitivity matrix elements A' corresponding to a uranium reference spectrum different from that previously employed are used as well as the same A' matrix elements previously utilized for K and T. A next fitting error e is determined based upon these new elemental concentration values and is compared to the prior fit error e.

The iterative process continues with successive selections of a different set of uranium sensitivity matrix elements for each reference uranium spectrum measured outside the test casing. Computations of $M_j$ based on each set of uranium matrix elements is made in an error minimization routine in which the fit error e is sought to be minimized. When such a minimum is found, the radial distance of the uranium source giving rise to the uranium reference spectrum and associated uranium matrix elements yielding the minimum error is correlative to the uranium despositional distance outwards from the field borehole center. Moreover, the $M_j$'s are considered to be the correct elemental concentrations which compensate for the anomalous radioactive deposition in the borehole region.

In summary, if anomalous deposition is detected, a set of sensitivity matrix elements is selected corresponding to a selected one of the uranium reference spectra derived from a uranium source outside test casing at a preselected radial distance d. A set of such elements correspsonding to the uranium reference derived from a uranium source inside the casing is also selected.

The aforementioned C=A'M equation is solved for $M_k$, $J_T$, $J_U$, using some combination of the U borehole reference spectral matrix elements from inside and outside the casing, but both in the borehole region. The uranium is thus modeled by two components, deposition inside and outside the casing. In the simplest embodiment the U-matrix elements are preselected based on a simple nominal combination of these two region reference spectra. In a second embodiment, a photoelectric indicator is used to determine how the reference spectrum is combined from the two spectra. $R_c$ and the resultant alpha function are thus constraints on the weighted least squares solution wherein total measured uranium concentration is considered a variable combination of uranium inside and outside the casing. Uranium counts attributable to uranium deposition inside the casing are thus effectively subtracted out from the total count rate in determining the uranium deposition outside and adjacent the casing and are accordingly in effect estimated from $R_c$ or alpha. The process can terminate here, or may be refined further as described in the paragraph below.

A next set of matrix elements corresponding to a uranium source outside the casing at a different preselected distance is substituted and a next set of elemental concentrations and fitting errors calculated. An iterative process continues substituting uranium matrix elements sets and calculating elemental concentrations and corresponding fitting erros until a minimum fitting error is detected. The concentrations yielding a minimum error are assumed to be the values which correct for the effects of anomalous uranium deposition in the borehole region.

BRIEF DESCRIPTION OF THE DRAWINGS

So that the manner in which the invention achieves the above-recited and other features, advantages and objects may be better understood and in greater detail, a more particular description thereof (which has been briefly summarized above) may be had with reference to the following discussion and embodiments illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE INVENTION

Naturally radioactive sources in earth formations emit gamma rays within a range of energies. The gammas are scattered by the well-known Compton effect to lower energies prior to reaching the vicinity of a well logging instrument (to be hereinafter described) which measures their respective energies. Accordingly, an essentially continuous energy spectrum of such gamma rays may be detected below approximately 350 Kev regardless of the radioactive source type. However, in a cased well such gamma rays will be attenuated by the casing and material adjacent thereto prior to their being detected by the instrument, and thus the appearance of such spectra will be affected by the characteristics of the material and the casing.

Both Compton scattering and another well-known phenomenon known as photoelectric absorption can be significant in such attenuation. However, the latter is particularly evident with respect to gamma rays having low energy ranges traversing materials with relatively large atomic numbers as can be seen from the expression:

$$\phi = Z^{4.6}/E^{3.15} \quad \text{Eq. 5}$$

where
$\phi$ = photoelectric absorption
$Z$ = elemental atomic number
$E$ = gamma ray energy At gamma ray energies below 150 Kev the total gamma ray attenuation is most predominantly affected by this photoelectric absorption phenomenon whereas above energies of approximately 200 Kev, the Compton scattering effect is considered to dominate the overall gamma ray attenuation process. From the foregoing, with respect to conventional casing such as iron having an atomic number Z substantially higher than that of other elements associated with the borehole (e.g. fluids, cement, and the formation itself), it has thus long been known that the casing material dominates the spectral characteristics below 150 Kev.

Figure 1:
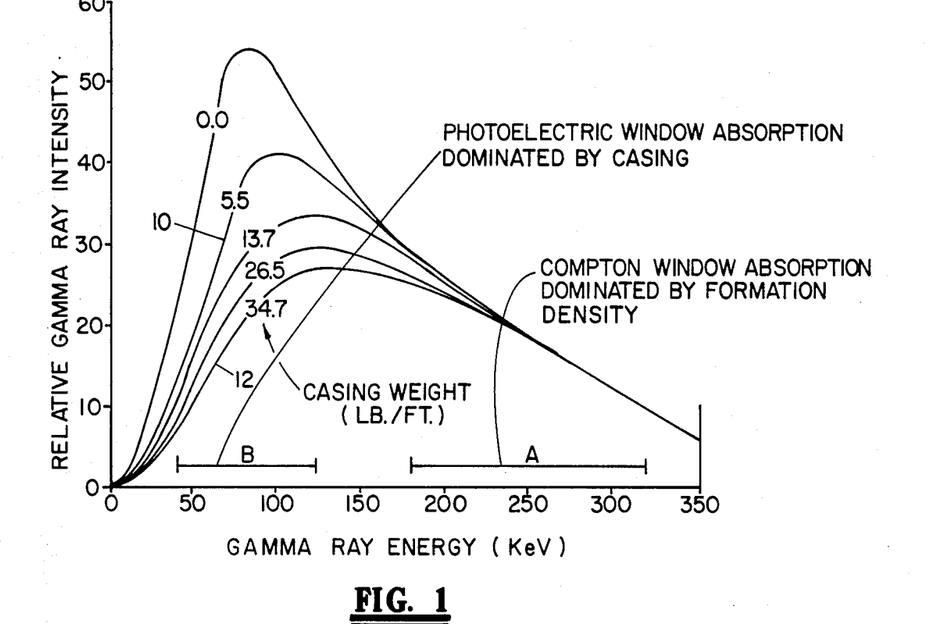
FIG. 1 is a graphical representation illustrating typical natural gamma ray energy spectra measured by a scintillationcasing. detector inside casings of varying wall thicknesses arising from uranium outside the casings.

The foregoing effect of casing on gamma ray spectra may be seen with reference to the accompanying FIG. 1 which depicts low energy spectra (0–350 Kev) measured in the same formation. Each such spectrum corresponds to a spectral measurement from within a different corresponding casing having a different weight but an identical nominal outside diameter, such spectra being conventionally normalized with respect to 275 Kev.

It may be seen from FIG. 1 that a high and low energy window within the ranges A and B respectively may be selected in a manner well known in the art whereby a casing ratio $R_c$ of counts in the window of range A to those in the window of range B may be formulated.

Still with reference to FIG. 1, it will be noted that just as each spectrum depicted therein is associated with a distinctive spectral shape, it is, in like manner associated with a particular casing weight. More particularly, it can be qualitatively observed that as the casing weight increases, these spectral shapes change from one such as spectrum 10 having a relatively steep slope or rollover to that of the spectrum associated with reference numeral 12 having a generally flatter left hand portion. From the foregoing, it will be appreciated that such a casing ratio may be used to provide a quantitative indication of casing thickness, given a nominal casing diameter $d_{csg}$, using an expression of the form:

$$t_{csg} = a(d_{csg}) + b(d_{csg})R_c + c(d_{csg})R_c^2 \quad \text{Eq. 6}$$

where a,b,c are predetermined functions of $d_{csg}$.

From the foregoing, it will be further appreciated that the functional relationship between the casing ratio $R_c$ and the casing thickness $t_{csg}$ is such that $R_c$ increases with increases in $t_{csg}$.

With the foregoing as background, disclosure follows hereinafter regarding use of the casing ratio $R_c$ as an indicator of relative radial position of radioactive deposits in the borehole region. This, in turn, will be followed with discussion of the use of such indications in accordance with the teachings of the present invention to select proper sensitivity matrix elements $a_{ij}$ (also to be hereinafter discussed in greater detail) in order to derive more accurate measurements of formation radioactive elemental concentrations.

Figure 2:
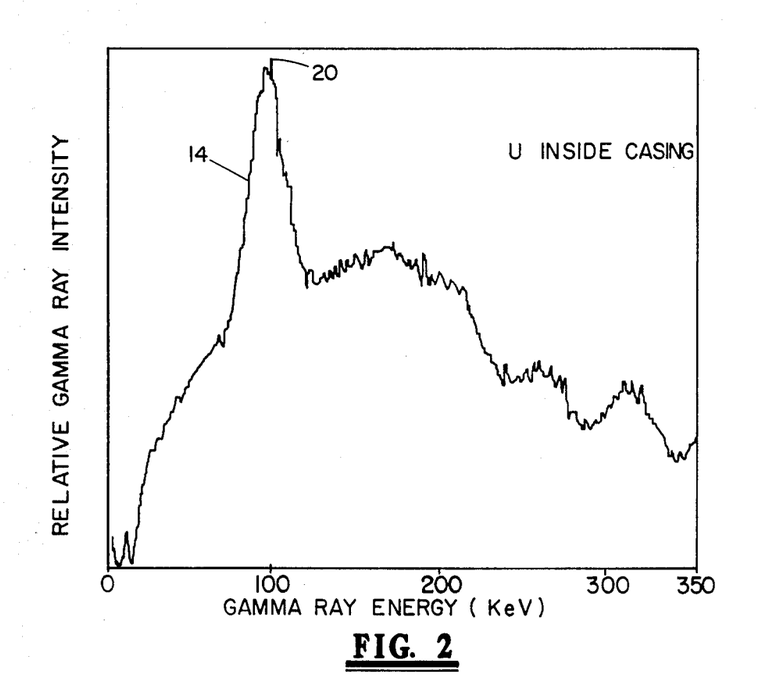
FIG. 2 is a graphical representation illustrating a typical natural gamma ray energy reference spectrum measured by a scintillation detector inside a casing arising from a cylindrical uranium sleeve source inside the casing.
Figure 3A:
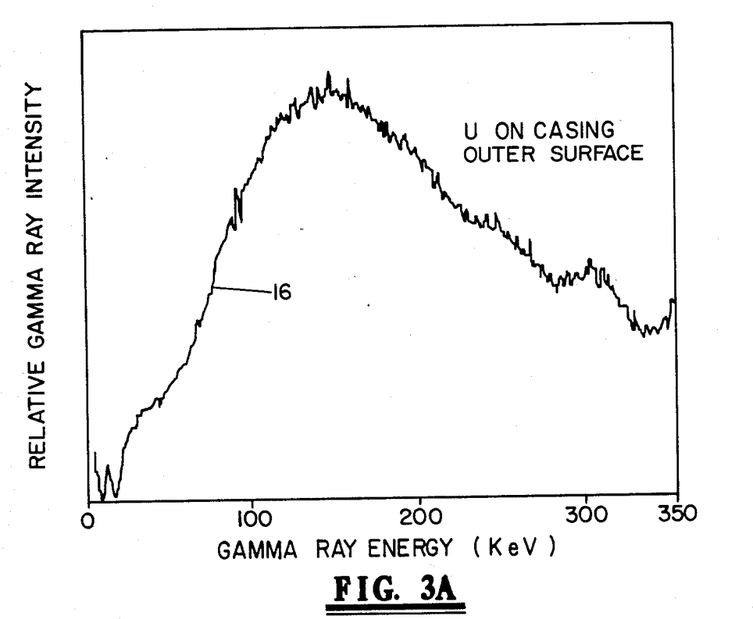
FIG. 3A is a graphical representation illustrating a typical natural gamma ray energy reference spectrum measured by a scintillation detector inside a casing arising from a cylindrical uranium sleeve source adjacent the outer surface of the casing.
Figure 3B:
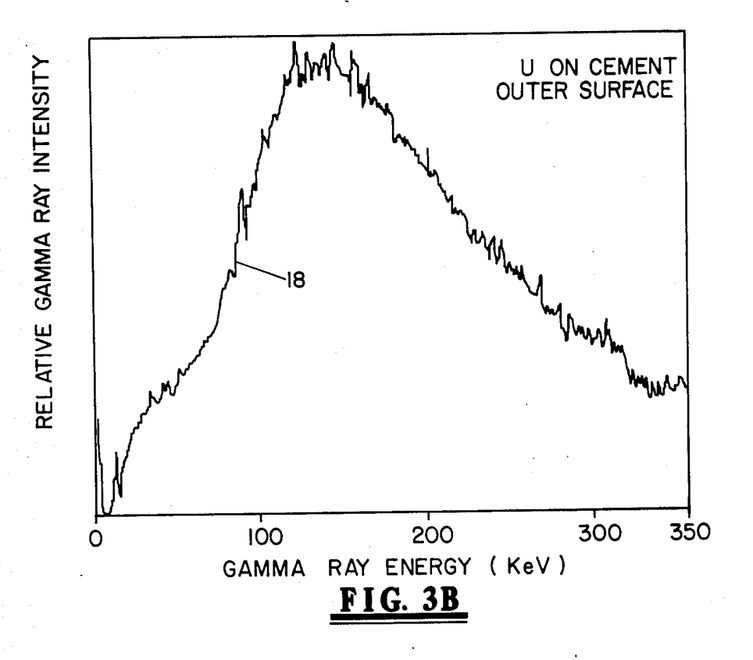
FIG. 3B is a graphical representation illustrating a typical natural gamma ray energy reference spectrum measured by a scintillation detector inside a casing arising from a cylindrical uranium sleeve source adjacent the outer surface of a cement layer disposed about the casing.

Referring now to FIGS. 2,3A, and 3B, there are depicted therein graphic representations of three low energy reference gamma ray spectra similar to those depicted in FIG. 1. These spectra were derived by measuring energies of gamma rays detected within a test casing arising from a uranium source placed at various locations radially outwards of the detector.

More particularly, the spectrum of FIG. 2 corresponds to the spectrum of a hollow cylindrical uranium source sleeve disposed about a detector and within a casing, thus simulating radioactive deposition on the inside surface of casing. The spectrum of FIG. 3A corresponds to energy measurements of the detector within a casing surrounded by such a uranium sleeve immediately adjacent the outer surface of the casing, thus simulating deposition of radioactive material on the outer surface of the casing. Finally, with respect to the spectrum depicted in FIG. 3B, this spectrum was derived by measuring gamma ray energies within a casing having a layer of cement radially outward therefrom with a uranium sleeve being disposed about the outer surface of the cement. This thereby simulates desposition of radioactive material at the interface between the borehole wall and cement annulus typically encountered in a cased and cemented borehole.

Several important characteristics may be noted in a comparison of the spectra under discussion. First, with respect to the spectrum of FIG. 2 simulating a spectrum which may arise from deposition or plating on the inner casing surface, a much more pronounced and steeper slope may be observed in the leading edge portion 14 of the spectrum relative to the corresppsonding leading edges 16 and 18 of the spectra of FIGS. 3A and 3B, respectively. This pronounced rollover or distribution of lower energy gamma rays in the spectrum of FIG. 2 is attributable to two factors. First the lower energy gamma rays in the FIG. 2 spectrum are not having to penetrate casing and experience the photoelectric absorption phenomena previously described relative to the gammas which must penetrate such casing in the spectra of FIGS. 3A and 3B. Secondly, the increased count rate of higher energy gamma rays on the leading edge 14 of the spectrum of FIG. 2 relative to the remaining spectra may further be attributable to a 78 Kev uranium x-ray peak 20. The peak is not observed in the spectra of FIGS. 3A and 3B due to attenuation of the gamma rays associated therewith in penetrating the casing and (to a lesser extent with respect to FIG. 3B), the cement layer disposed about the casing.

In like manner, a comparison of the spectra of FIGS. 3A and 3B again reveals clearly distinct spectral shapes particularly with respect to the lower energy rollover portions 16 and 18 of the spectra. Again, these differences in spectral shape are attributable to the differing amounts of material through which the gamma rays giving rise to the spectra must pass prior to detection within the casing. More particularly, regarding the FIG. 3A spectrum simulating uranium deposition on the outer surface of the casing, such gamma rays must only pass through the casing wall thickness. With respect to the spectrum of FIG. 3B, however, which simulates uranium deposition on the outer cement surface, these gamma rays must pass through the cement annulus as well as the casing, giving rise to an energy distribution differing from that of the spectra of FIGS. 2 and 3A. It will be noted that the various spectra of FIGS. 2-3B have not been normalized although the foregoing clearly distinct differences in the spectra would remain upon doing so.

From the preceeding discussion, it will be appreciated that such a ratio may be formulated in a conventional manner from the various spectra. More particularly, by selecting count rates in the energy window A corresponding to the higher energy or harder portion of the spectrum, and dividing this by count rates selected from the energy window B corresponding to the lower energy or softer portion of the various spectra, such a casing ratio $R_c$ may be formulated for each of the spectra depicted in FIGS. 2-3B. More importantly, however, it may be understood that not only will such $R_c$ values differ, but that these relative values may be gainfully employed as indicators of the particular different physical locations of the radioactive sources associated with the differing spectral shapes as hereinbefore noted.

It will be recalled that $R_c$ is a generally increasing function of casing thickness $t_{csg}$ and the amount of other material such as cement through which the lower energy gamma rays must pass. Thus a value for $R_c$ of x may be defined to correspond to the spectrum of FIG. 2 and the physical situation of radioactive deposition on the inner casing surface.

In like manner, a larger value for $R_c$ of y may be defined corresponding to the physical situation of radioactive deposition outside the casing as, for example, in the cases of deposition on the outer surface of the casing (with respect to FIG. 3A) or on the outer surface of the cement (with respect to FIG. 3B).

Still further, a value of $R_c$ of $\alpha$ may be observed between these two values x and y. This may be interpreted as corresponding to the physical situation wherein radioactive deposition is present partially on the inner casing surface and partially outside the casing (either on the outer casing surface, within the cement annulus, on the outer surface of the cement, or in combinations thereof).

More particularly, a function $f(R_c,x,y)$ may be defined which will characterize the proportion of such deposition on the inner casing surface relative to such deposition radially outwards therefrom on the outer casing surface, in the cement annulus, and/or on the outer cement surface. For illustrative purposes only, wherein this function f may be considered linear, it may take the form of Equation 2.

The observed uranium gamma ray energy spectrum S detected in the logging instrument under field conditions from depositional activity adjacent the borehole may be thought of as being comprised of two components. First, a portion of the spectrum S may arise from a deposition on the inner surface of the casing (when present) having a spectrum $S_i$ such as that of FIG. 2. A second component of the detected spectrum S may further arise from radioactive deposition radially outwards of the casing (either on the outer surface thereof, within the cement annulus, and/or on the outer cement surface). Such deposition, when present, may have a spectrum $S_o$ such as that of FIG. 3A or 3B.

When:

$R_c = x$ and $\alpha = 0$, $S = S_i$
$R_c = y$ and $\alpha = 1$, $S = S_o$.

When: $R_c$ and alpha are between x and y and 0 and 1, respectively, S will be comprised of a combination of the $S_i$ and $S_o$ spectra due to uranium deposition inside and outside the casing in the alpha and 1−alpha proportions, respectively.

In the case where $R_c = x$ and $S = S_i$, this may be recognized as corresponding to the situation of FIG. 2, wherein the detected gamma ray spectrum is dominated primarily from radioactivity deposition on the inner surface of the casing. In this case, the aforementioned matrix elements $A'_{ij}$ for uranium may be selected so as to model this spectrum.

Furthermore, it will also be recalled that these matrix elements $A'$ may be employed to determine relative elemental concentrations of radioactive elements K-U-T, in accordance with the relationship of Equation 1.

In deriving such elemental concentrations it will be recalled that sensitivity matrix elements $A'_{ij}$ are also employed for the elements K and Th by deriving and storing such elements for K and Th based upon test formations and thence compensating such elements for borehole effects in accordance with the previously described relationship of Equation 1.

In summary, then, in response to measurement and derivation of a cased hole total gamma ray energy spectrum, a casing ratio $R_c$ may be derived therefrom in the conventional manner. When $R_c$ equals a casing ratio value of x (indicating radioactive deposition primarily on the inner surface of the casing), sensitivity matrix elements $A'_{ij}$ are derived from the standard spectrum which simulates radioactive deposition on the inside surface of the casing. Such uranium sensitivity elements are then employed in combination with elements $A'_{ij}$ for K and Th compensated by the borehole compensation variable L and derived from test formations containing such elements in the manner previously described. More particularly, they are employed to derive the relative elemental concentrations $M_{k,u,t}$ from the relationship defined in Equation 3.

Similarly, with reference to the relationship of Equation 2, the $R_c$ derived from a total gamma ray energy spectrum log at a particular borehole elevation may equal a preselected value y greater than x derived from reference spectra such as that of FIGS. 3A or 3B. This will indicate deposition of radioactive material on the outer surface of the casing or such deposition disposed further radially outwards, as, for example, in the cement annulus or on the outer surface of the cement or a combination thereof. Such values for x and y may be experimentally predetermined as, for example, by employing test formations and uranium sleeves or jackets in the manner previously described with respect to the spectra depicted in FIGS. 2-3B.

Upon detecting a value for the casing ration of $R_c = y$ from the measured field spectrum (indicating radioactive deposition on the outer surface of the casing and/or radially outwards therefrom in the vicinity of the borehole), uranium sensitivity matrix element $A'_{ij}$ will be employed which are derived from a test spectrum such as that of FIG. 3A corresponding to uranium deposition on the outer surface of a casing. Such elements $A'$ of course may be modified in a manner previously described with respect to the relationship of Equation 1 and the variable L to account for the particular characteristics of the casing employed in the well. These elements $A'$ for uranium derived from a test reference spectrum (such as that of FIG. 3A wherein a uranium sleeve was disposed on the outer surface of a test casing) will be employed with like sensitivity matrix elements for potassium and thorium to derive relative elemental concentrations in accordance with the relationship defined in Equation 3. It will be recalled that these elements $A'$ for K and Th were derived from spectra generated from test formations containing known concentrations of these radioactive elements in a manner previously described. Of course if no uranium deposition in the borehole region were present, the elements $A'$ for U would also be selected based on uranium distributed in the formation uniformly.

Various means are known in the art for quantifying the accuracy of these derived elemental concentrations $M_{k,u,t}$ from Equation 3. As but one example previously described with reference to Equation 4, a normalized fitting error e may be computed which measures the accuracy of fit of various combinations of elemental reference or test gamma ray log spectra to the observed total gamma count spectrum.

The radioactive deposition may not in fact be substantially on the outer surface of the casing as represented by the spectrum of FIG. 3A. Rather, it may appear to be substantially on the outer surface of the cement at the cement-borehole wall interface, as indicated in FIG. 3B. The matrix elenents $A'$ employed for the uranium element and derived from the FIG. 3A spectrum may thus not accurately model the physical situation in subsequent $M_{k,u,t}$ determinations.

Accordingly, another set of sensitivity matrix elements $A'$ may in like manner be derived from a test spectrum such as that of FIG. 3B corresponding to uranium deposition on the outer surface of the cement. These sensitivity elements for uranium may then be replaced for those corresponding to the Figure 2 spectrum in repeating a determination of both the elemental concentrations $M_{k,u,t}$ and the fitting error e in accordance with the relationships of Equations 2 and 3, respectively.

If the fitting error magnitude derived by using the sensitivity matrix elents $A'$ corresponding to the spectrum of FIG. 3B as just described in less than the corresponding fitting error e derived with respect to the spectrum of FIG. 3A, it may be concluded that the spectrum of FIG. 3B is more accurately modeling the physical well logging situation, e.g. such results may be taken as indicative of uranium deposition on the outer surface of the cement as opposed to such deposition on the outer casing surface. On the other hand, if the fitting error associated with elemental concentration determinations $M_{k,u,t}$ employing uranium matrix elements $A'$ derived from test spectrum FIG. 3A is less than the correlative fitting error e derived by employing sensitivity elements $A'$ from the spectrum of FIG. 3B, it may be concluded that such plating is more accurately deemed to be present on the outer casing surface.

Yet a third possibility may exist wherein radioactive deposition occurs by way of fingering or channeling or the like at radial locations between the outer casing surface and the outer cement surface (either alone or in combination with such deposition or plating on the casing surface and/or outer cement surface). In this event, it will be appreciated that additional test spectra modeling these physical situations similar to those of FIGS. 3A and 3B may be experimentally derived and corresponding elements $A'$ derived and associated therewith. This may be done, for example, by placing a uranium source within the cement sleeve Thereafter, in like manner to the calculation of $M_{k,u,t}$ concentrations and corresponding fitting errors employing the spectrum of FIGS. 3A or 3B, elemental concentrations and fitting errors may further be derived employing these additional spectra as desired. The particular test uranium spectrum and corresponding sensitivity matrix elements $A'$, and elemental concentration yielding the minimum fitting error e may be considered as those most accurately modeling the physical radioactive deposition situation encountered. In other words, if a minimum e is derived from this iterative procedure from sensitivity matrix elements from a test spectrum generated with uranium disposed on the outer cement surface, within the cement annulus, or on the outer casing surface it may be concluded that such radioactive desposition is substantially on the outer cement surface, within the cement, or on the outer casing surface, respectively.

The foregoing situations have dealt primarily with conditions wherein uranium deposition is substantially on (1) the inner surface of the casing ($R_c = x$), or (2) when such deposition is substantially either on the outer surface of the casing, radially outwards therefrom within the cement or on the outer surface of the cement, or a combination thereof ($R_c = y$).

However, yet another case, briefly noted previously, may be encountered wherein radioactive deposition occurs both on the inside of the casing and on the outside of the casing (either on the outer surface, within the cement, on the outer surface of the cement, or combinations thereof). With respect to this situation, it will be noted that $R_c$ may be expected to be within the range of x-y.

Such a value for $R_c$ may indicate a combination of radioactive depositional activity both inside the casing and radially outwards thereof. However, no means has been heretofore provided for accounting for such combined depositional activity in a more accurate determination of radioactive elemental concentrations and the relative presence thereof at various radial locations within the vicinity of the borehole (such as on the inner and outer casing surfaces, within the cement annulus, and/or on the outer cement surface). Description of such a technique hereinafter follows.

When a value for $R_c$ is determined from an observed gamma ray energy spectrum log at a particular borehole elevation within the aforementioned x-y range, such an $R_c$ value may be considered as indicative of combined plating or deposition, both on the inner surface of the casing and outwards therefrom. Moreover, it will further be recalled that it is a feature of the present invention to provide a function alpha=$f(R_c,x,y)$ such as the simplified linear form illustrated in Equation 2 and used to account for this combined depositional activity.

The total gamma ray energy spectrum from uranium measured within the logging instrument disposed within the casing may be thought of in these combinational deposition situations as a composite spectrum. Such a spectrum is comprised of two spectra in relative proportions, namely one spectrum such as that of FIG. 2 corresponding to deposition on the inner surface of the casing, and a second spectrum such as that of FIG. 3A or 3B corresponding to a spectrum and physical radioactive deposition radially outwards therefrom.

The two reference spectra may be combined in a preselected manner or maybe emphasized or weighted in functional relation to alpha and thus $R_c$. In this latter manner their relative contributions to the uranium portion of the total observed spectrum are correctly accounted for. This results in a more accurate determination of relative elemental concentrations and indications of the amount of deposition at various radial distances (e.g. on the casing inner surface plus on the outer surface, within the cement, on the outer cement surface, or combinations thereof) relative to one another. (Of course when $R_c$ is not measured, this last combination step using $R_c$ is not possible—this is true if a version of the tool using a titanium or still housing is used).

In implementing such a determination, a set of uranium sensitivity matrix elements may be derived and stored from a test spectrum corresponding to uranium plated on the inside surface of the casing as, for example, with respect to the spectrum of FIG. 3A previously described. In like manner, a set of additional sensitivity matrix elements A' may be derived corresponding to one or more test uranium spectra such as those of FIGS. 3A and 3B which model deposition at various locations at the outer casing surface and radially outwards therefrom in the cement and/or at the cement-borehole wall interface. Each such set of sensitivity matrix elements will uniquely correspond to a different such spectrum such as that of FIGS. 3A or 3B. As previously noted, additional spectra and corresponding sensitivity matrix element sets may be provided for depositions at various radially outward locations within the cement wall as desired.

Once this plurality of sets of sensitivity matrix elements has been derived from their corresponding spectra (corresponding to a deposition on the inner casing surface and at least at one location radially outwards therefrom), the relative contributions of such spectra and their sensitivity matrix elements to the total observed gamma ray spectrum may then be assessed. This is done as a function of the measured value for alpha and $R_c$ from the observed field spectral data.

More particularly, the value for alpha and $R_c$ will be indicative of the contribution of uranium deposition on the inner casing surface to the total observed gamma ray spectrum relative to such contributions from deposition occurring on the outer surface of the casing or radially outwards therefrom.

Accordingly, first a depositional situation will be assumed wherein deposition occurs both on the inner and outer surfaces of the casing in varying proportion related to alpha and $R_c$. A set of values for matrix sensitivity elements for a spectrum such as that of FIG. 2 (corresponding to deposition on the inner surface) and a different set of matrix elements (corresponds to a spectrum such as that of FIG. 3A and deposition on the outer surface of the casing) will be recalled. Elemental concentrations $M_{k,u,t}$ will be then derived (Equation 3) as well as a corresponding fit error e (Equation 4), using the two sets of A' for uranium.

In like manner, it will next be assumed that the possible depositional situation is one in which anomalous radioactive deposition is on the inner casing surface and at a radially outward location within the cement annulus. The latter will be modeled by a test spectrum (not shown) similar to that of FIGS. 3A and 3B and a test spectrum generated therefrom. Such a spectrum will accordingly in like manner to the foregoing yield a corresponding set of sensitivity matrix elements.

The two uranium spectra and correlative matrix element sets (corresponding to deposition on the inner casing surface and in the cement) will be employed to determine elemental concentrations $M_{k,u,t}$ and a corresponding fit error e according to Equations 2 and 3. These will be derived assuming relative uranium spectral shape contributions to the total observed spectrum from deposition inside casing and in the cement..

Finally, a third depositional situation may be assumed corresponding to radioactive deposition on the inner casing surface and on the outer surface of the cement, again in relative proportions of alpha and 1—alpha. Elemental concentrations and a corresponding fit error e, in like manner, are then derived according to Equations 2 and 5. The relative contributions of uranium deposition on the inner casing surface and outer cement surface to the total observed gamma ray count are taken into account by two sets of matrix elements for uranium deposited inside and outside the casing in Equation 3. The total uranium concentration equaling the combined uranium concentration from deposition inside and outside the casing serves as a constraint on Equation 3.

It may be assumed that the depositional situation and corresponding uranium sensitivity matrix elements giving rise to the minimum value for the fit error e, most accurately characterizes the actual depositional situation and resulting relative $M_{k,u,t}$. For example, the minimum fit error e may occur for a relative proportional combination of uranium reference spectra corresponding to deposition on the inner casing surface and on the outer cement surface (e.g. the last example). It may then be assumed that such deposition on the inner casing surface and outer cement suface in the proportion of alpha and (1—alpha) most accurately models the actual radioactive deposition in the vicinity of the borehole as well as the resultant values for $M_{k,u,t}$. The iterative selection process for the location of uranium outside the casing is time consuming, it may therefore be preferable, for expediency to choose only one reference spectrum y for deposition outside the casing and use that for all such depositions, bypassing the error minimization step. If a casing ratio is not available, it will also be necessary to bypass the alpha selection process for dynamically combining the inside versus inside uranium reference spectrum. In this case a nominal uranium borehole reference spectrum can be used.

WELL LOGGING SYSTEM

Figure 4:
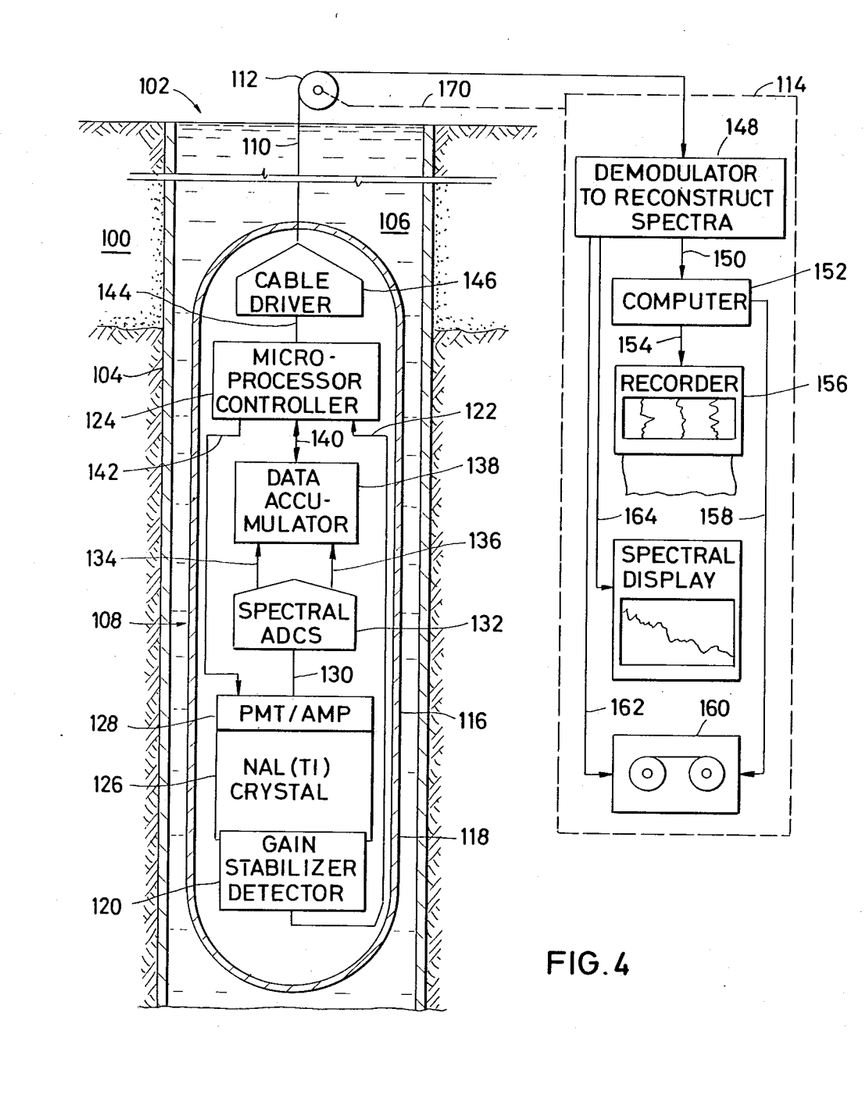
FIG. 4 is a schematic diagram of the well logging system employing the concepts of the present invention.

Referring now to FIG. 4, a representative well logging system is schematically depicted therein which is adapted to perform in accordance with the concepts of the present invention. Further description of such an appropriate system may be found in the aforementioned U.S. Pat. No. 4,527,058.

An earth formation 100 is penetrated by a well borehole 102 which may be lined with a casing 104. The invention may be practiced as well in an open hole if desired in which case the casing 104 is not required. The borehole 102 contains a borehole fluid 106 employed primarily to provide a hydrostatic head to control subsurface formation pressures in uncased wells, and as a natural result of production or injection operations in cased wells.

A logging instrument or tool 108 is conventionally disposed within the borehole 02 by means of an armored well logging cable 110. The cable 110 is routed over a sheave wheel 112 to a surface system indicated generally by reference numeral 224 which will be hereinafter described in greater detail. The cable 110, in addition to providing support and motive power to the tool 108, also provides a telemetry data and control singal link between the tool 108 and the surface system 114 as well as providing electrical power form the surface to run the various instruments contained within the tool 108 to be described.

Still referring to FIG. 4 and the tool 108 in particular, a steel pressure housing 116 is provided for containing the various circuitry of the tool 108. For most logging situations wherein relatively low pressures and temperatures are encountered, the tool 108 will further incorporate a tool case section 118 fashioned of a low atomic number material. For reasons well known in the art, such a configuration will permit casing and lithology measurements in non-barite mud environments. However, in high pressure/temperature environments, the tool case housing 228 is preferably fashioned of a stronger material such as titanium. Due to the relatively high atomic number of titanium, the photoelectric casing/lithology measurements discussed herein are seriously degraded because the housing significantly attenuates the photo-electric portion of the spectrum, however the K-U-T borehole-compensated measurements may still be made.

The downhole equipment contained within the logging tool 108 will now be described with reference first to provision for gain stabilization. It will be appreciated that both embodiments of the tool 108 having either the low Z or titanium housing 118 will incorporate the same detector section and associated electronics including a downhole analog-to-digital converter and gain stabilizer.

With respect to gain stabilization, a coincidence gain stablization or coincidence counting stabilizer technique automatically adjusts the downhole system for any gain changes experienced during tool warmup or operation, distinguishing formation gamma rays from those originating in the stailzer source. More particularly, a principal detector is comprised of a NaI(TI) crystal 126 and low noise photomultiplier tube-amplifier 128. Proximate to the crystal 126 is a smaller crystal-detector assembly or stabilizer 120 (which contains an embedded americium source used for the gain stabilization) and a coincidence gain stabilization detector. Decay of americium produces essentially simultaneous emission of a 60 Kev gamma ray and a high energy alpha particle. The alpha particles are detected by the smaller detecter 120, whereas many of the 60 Kev gamma rays are detected by the larger crystal 126 and photomultiplier tube 128 combination.

It will be noted that in the conventional manner, the crystal 126-photomultiplier tube (PMT) 128 combination detects gamma rays incident on the crystal 126 which may be coming from the americium source or from locations outwards of the logging tool 108 which contain the desired logging information. Because these gamma rays from the stabilizer 120 are coincident with the aforementioned alpha particles, such gammas can be isolated from the other natural gamma rays detected in the crystal 126 from outside the tool 108 with great efficiency. The reason for doing so is two-fold. The gamma ray coincidence spectrum (i.e. detected 60 Kev gamma rays coincident with the alpha particles) will be unaffected by changes in the number or distribution of external gamma rays. Thus, this spectrum may be utilized as an automatic gain control signal yielding improved gain stailization. Moreover, a gamma ray spectrum derived from the crystal 126-PMT 128 detector which is an anti-coincidence with the alpha particles will accordingly contain gamma radiation originating exclusively from the formation, thus averting the need to strip out or otherwise remove gamma rays arising from the americium source.

With the foregoing in mind, a coincidence stabilizer pulse 122 is delivered from the gain stabilizer crystal-detecter 120 to a microprocessor controller 124. The pulses will correspond in time to the generation of the 60 Kev stabilizer gamma rays and alpha particles. The microprocessor controller 124 will employ this timing information to derive the aforementioned coincidence and anti-coincidence spectra.

Analog voltage signals 130 each having amplitudes corresponding to the energy of each gamma ray detected by the crstal 126-PMT 128 are delivered from the PMT 128 to a dual range spectral analog-to-digital converter ar ADC 132. The ADC 132 outputs digitized equivalents to the analog gamma ray signals 130 in two channels 134 and 136. The first channel 134 comprises digitized energy magnitudes corresponding to energy of gamma rays having energy levels within the 0-3.0 Mev range, whereas the second channel 136 comprises digitized energy magnitudes correponding to energy of gamma rays having energy levels within the 0-350 Kev range, such digitized signals being delivered to a data accumulator 138. The data accumulator 138 in communication with the microprocessor controller 124 by means of an input/output bus 140 formulates digitized data from the channels 134 and 136 into coincidence and anti-coincidence spectra.

With respect to the coincidence spectrum, digitized detected gamma rays within the energy range of 0-350 Kev coincident with the 60 Kev americium gamma rays are formed into a 256 channel spectrum. It will be recalled that coincidence or timing information indicating detection of such americium decay gamma rays is fed to the controller 124 as stabilizer pulse 122. This timing information is in turn relayed by the I/O bus 140 to the data accumulator 138 to accumulate the aforementioned coincidence spectrum. The magnitude of this coincidence spectrum is monitored by the controller 124 through the I/O bus 140 whereupon an automatic gain or stabilizer control signal 142 is periodically generated and delivered o the PMT 128. This control signal will regulate the high voltage control and accordingly the gain of the PMT 128 so as to maintain the PMT 128 gain within tightly controlled limits functionally related to the magnitude of the coincidence spectrum.

In like manner, anti-coincidence events (formation and borehole gamma radiation external to the tool) accumulated by the accumulator 138 are converted into two spectra. The first spectrum is a 256 channel spectrum spanning the low energy range of 0-350 Kev which is utilized primarily for photoelectric lithology and casing measurements wherein, for exmaple, lightology and casing ratios $R_{lith}$ and $R_c$, respectively, are formulated from the spectra. The remaining 256 channel spectrum spans the high energy range of 0–3000 Kev and is employed in borehole compensated K-U-T determinations herein described. In like manner to the coincidence spectrum generated by the data accumulater 138, timing indications of non-coincidence of detected gamma rays with the americium-decay 60 Kev gamma rays is in like manner delivered on the I/O bus 140 from the controller 124 to the data accumulator 138. In this manner, detected gamma rays not coincident with those associated with americium decay may be accumulated for forming the aforementioned anti-coincidence spectra.

In response to control from microprocessor 124, these three spectra accumulated in the data accumulator 138 are retrieved therefrom and transmitted by the microprocessor controller 124 as encoded spectra signals 144 to an appropriate controller 124 as encoded spectra signals 144 to an appropriate cable driver 146. These spectra are then transmitted to the surface system 114 preferably approxiately each 0.25 feet while logging. It will be appreciated that appropriate telemetery and control information generated by the controller 124 will maintain an orderly transmission of the appropriate spectra on the logging cable 110 to the surface 114.

A conventional mechanical or electrical system associated with the sheave wheel 112 will deliver signals on a coupling 170 to the surface system 114 which will indicate the depth of the logging instrument 108 within the borehole 102. In a conventional fashion, circuitry within the surface system 114 will generate appropriate depth control and interrupt signals which may be transmitted down the logging cable 110 for purposes well known in the art, including interrogation of the circuitry contained within the logging instrument 108 in order to derive the aforementioned spectra corresponding to preselected depth levels or increments within the borehole 102.

The surface system 114 will now be described in greater detail. It will be recalled that spectral data will be modulated onto the logging cable 110 in a manner so as to facilitate the demodulation or separation of the various spectral data into the desired three spectra at the surface. Accordingly, a demodulator 148 is provided within the surface system 114 for receiving this spectral data on the logging cable 110 and demodulating it so as to separate out and reconstruct the three various spectra. Digital representations of such spectra are thence delivered on line 150 to an appropriate surface computer 152 which provides the wellsite control and data processing functions for the system. The computer may be any of a number of computers familiar to those skilled in the art and easily adapted to implement the teachings of the present invention including the procedures represented in the flow diagram of FIGS. 5 and 5A.

The surface system 114 will preferably include a recorder 156 of some form for recording well logging data thus derived for visual observation in resposne to an appropriate data and control signal 154 from the computer 152. The surface system 114 will further preferably include a storage device 160 such as a magnetic tape disk drive or the like for storing, for example, raw spectral and output data in the form of magnetic tapes or disks in resposne to a data and control signal 158 from the computer 152. Accordingly, spectral data will be carried on line 162 from the demodulator 148 for delivery to the storage device 160 for subsequent storage of the raw spectra and output data. Finally, it may also be preferable to provide in wellsite system 114 a spectal display 168 which provides visual indications of the various aforementioned spectra in response to a spectral signal 164 from the demodulator 148.

Figure 5:
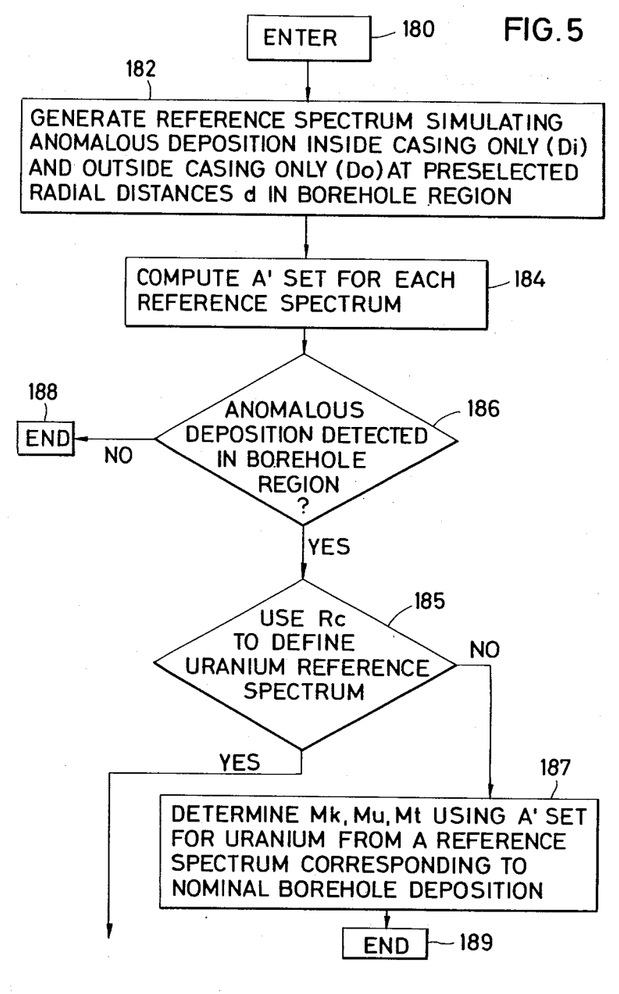
FIGS. 5 and 5A are a flow chart illustrating one manner of determining elemental concentrations in accordance with the present invention.
Figure 5A:
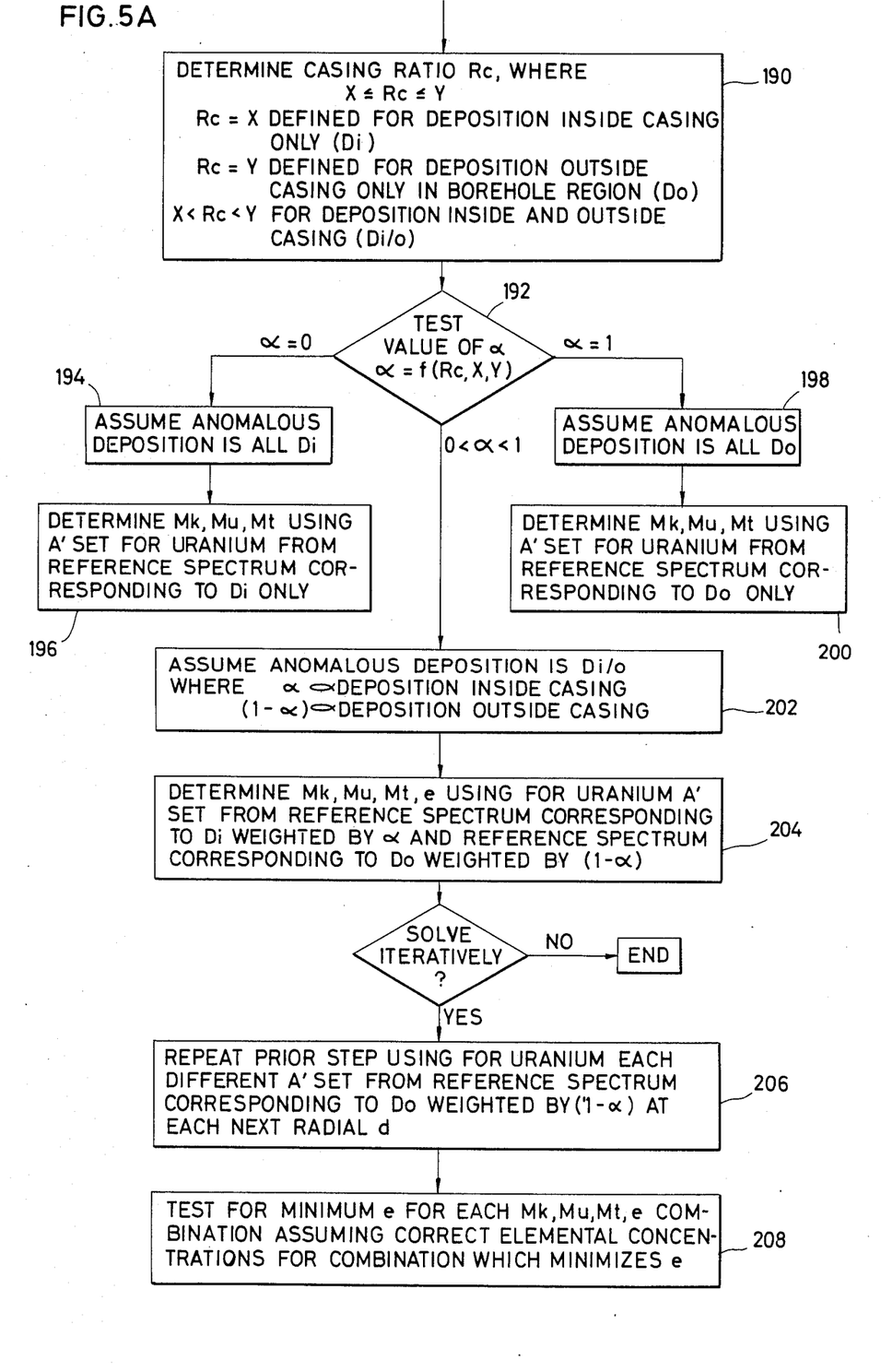

In FIGS. 5 and 5A a flow chart is shown illustrating a procedure or routine for use in the computer 152 of the surface system 114. The procedure depicted therein is a method whereby the hereinbefore noted anomalous radioactive depositions may be identified and corrected in accordance with the teachings of the present invention.

A few preliminary remarks are in order with respect to FIG. 5 and 5A. Preferably reference spectra and corresponding matrix elements A' such as those of FIGS. 2,3A, and 3B have been generated and stored such as in storage device 160 as shown by blocks 180 and 182 prior to the logging operation.

However, these operations, while not typically a part of the routine being described, are shown as preliminary steps to indicate the necessity for such reference spectra and matrix elements. Moreover, it is assumed that gamma spectral well logging data is being derived in the conventional manner by the system depected in FIG. 4 during a well logging operation and that such data is operated upon in the manner described herein. Thus, a block so indicating this assumed generation of data has been omitted.

With reference to block 186, this block is intended to schematically indicate that the system 114 must determine presence of anomalous radioactive deposition in the borehole region before proceeding further. Otherwise the routine terminates as indicated by block 188. It will be recalled that such detection of anomalous depositional activity may occur in accordance with a number or criteria detected either automatically during the logging operation or in response to a preset flag prior to commencing the log.

As but one example, anomalous deposition may be assumed to be present for a given borehole increment when $R_c$ (which may be continuously determined from the log data) is within a preset range (x,y) previously described, wherein x and y were predetermined from reference uranium spectra as shwon by block 190. Such anomalous deposition may also be determined, for example, from comparison of current and historical gamma ray logs, field knowledge, and the like as indicated by decision block 185, in which case the A' elements for uranium may be selected using information on other than the casing ratio $R_c$. For example, if it is known that in a certain zone uranium deposition has occurred, the block 187 is entered, where A' elements from a spectrum such as FIG. 3, may be substituted into the K-U-T solution matrix.

Continuing with FIG. 5, once anomalous deposition has been detected as indicated by block 186, the program may determine whether the $R_c$ from the logging data is equal to x or y (indicating deposition inside or outside the casing exclusively), or whether $R_c$ is in the x-y range (indicating deposition both inside and outside the casing in the borehole regions).

Referring now to FIG. 5A, based upon $R_c$ from the log for a particular borehole increment being the range of x-y, the value of alpha will be determined as indicated by block 192. In this illustration alpha may be 0,1 or within the range of 0-1.

If alpha equals 0, it will be thus assumed that all anomalous deposition is inside the casing, indicated by block 194. Accordingly, as previously described, the computer 152 will assume the spectral shape for all uranium contributing to the total observed spectrum will be that of FIG. 2 for example, ie. that of a reference uranium spectrum generated from a standard uranium source inside a test casing which simulates such plating on the casing inner surface. Sensitivity matrix elements A′ for this uranium spectru mpreviously determined and stored will then be used along with those for K and Th from test pit data to determine $M_{k,u,t}$ per Equation 3 as shown by block 196.

If, on the other hand alpha=1, as shown by block 198, it will be assumed that all anomalous deposition is outside the casing. The program will accordingly assume the spectral shape for all uranium contributing to the observed spectrum will be that of a previously generated reference spectrum such as that of FIG. 3A or 3B (i.e. a spectrum generated from a standard source outside the casing simulating deposition outside the casing in the borehole region). Sensitivity matrix elements from this reference spectrum will then be used with those of K and Th to determine $M_{k,u,t}$ per Equation 3 as shown by block 200.

When alpha is in the range of 0–1, this indicates combined anomalous uranium deposition in the borehole region both inside and outside the casing in the proportions alaph and (1−alpha), respectively. This is schematically shown by the exit in the program from decision block 192 to block 202. A previously derived set of sensitivity matrix elements A′ corresponding to a uranium reference spectrum from deposition inside the casing (such as FIG. 2) is then recalled. Also a previously derived set of such elements A′ corresponding to a uranium spectrum from deposition outside the casing in the borehole region (such as that of FIG. 3A) is recalled.

As indicated by block 204, equations 3 and 4 are then employed to solve for $M_K$, $M_T$, $M_{U\ inside\ casing}$, $M_{U\ outside\ casing}$, $M_{U\ total}$, and e. It will be noted that the total uranium concentration $M_{U\ total}$ is actually broken into two components of uranium deposition inside and outside the casing. Due to the additional set of uranium sensitivity matrix elements provided by uranium reference spectra modeling deposition outside the casing, the C=A′M equation will be of the form:

$$C = A' \begin{bmatrix} M_K \\ M_U \text{ formation} \\ M_{Th} \\ M_U \text{ inside casing} \\ M_U \text{ outside casing} \end{bmatrix}$$

with alpha serving to constrain the weighted least squares solution of equation 3. IThus uranium counts in the total observed spectrum attributable to uranium deposition inside the casing are therefore effectively subtracted out and in effect being estimated from $R_c$.

The step described in the preceding paragraph may then be repeated if desired (decision block 205) substituting a different set of matrix elements corresponding to the uranium reference spectrum such as that of FIG. 3A derived from reference deposition outside the casing. More particularly, the new uranium matrix element set will correspond to a different uranium reference spectrum such as that of FIG. 3B derived from a reference spectrum corresponding to deposition outside the casing at a different radial distance d.

This iterative determination of $M_{k,u,t}$ and e values by the program is continued. Each set of matrix elements corresponding to each uranium spectrum derived from deposition outside the casing in the borehole region at different distances d is employed. This step is depicted as logic block 206.

In accordance with block 208, when all uranium reference spectra and corresponding A′ matrix element sets have been used to derive corresponding sets of $M_{k,u,t}$ an e, and e minimization routine is executed per block 208 to determine the minimum e and corresponding $M_{k,u,t}$. These elemental concentrations will then be assumed to be the correct values. The particular uranium reference spectra used to arrive at these $M_{k,u,t}$, e values will be assumed to correctly model the anomalous uranium deposition and the relative proportions thereof both inside and outside the casing in the borehole region and will accordingly yield more accurate thorium and potassium concentrating values.

The foregoing description may make other alternative arrangements according the concepts of the present invention apparent to those skilled in the art. Accordingly, while the methods and forms of apparatus herein describe constitute preferred embodiments of this invention, it is to be understood that the invention is not limited to these precise methods and forms of apparatus, and that changes may be made therein without departing from the scope of the invention.

What is claimed is:

1. A method for compensating for anomalous radioactive deposition in the region of a borehole in determining subsurface earth formation natural radioactivity elemental concentrations, comprising:

measuring a first reference spectrum of a first radioactive material simulating deposition of said first material in the borehole region;

measuring second and third reference spectra simulating deposition of second and third radioactive materials in the said formation, respectively;

deriving a set of elemental determination sensitivity matrix elements based on each of said first, second, and third reference spectra;

measuring from within said borehole a downhole natural gamma ray energy spectrum of gamma rays originating in and traversing said borehole and formation;

determining a condition of anomalous deposition of said first material in said borehole region; and calculating compensated elemental concentrations of said first, second, and third materials from said downhole gamma ray spectrum,a nd said sensitivity matrix element sets for said first, second, and third materials.

2. The method of claim 1 wherein said first material is a radioisotope of uranium and its daughter products.

3. The method of claim 2 wherein said second and third materials are radioisotopes of potassium, and thorium and its daughter products.

4. The method of claim 1 wherein the borehole region in which the measurement is made contains a casing and first material is deposited on the inner casing surface, the outer casing surface, or some combination thereof.

5. The method of claim 1 wherein said borehole contains a casing surrounded by an annulus of cement and said first radioactive material is deposited within the borehole region.

6. The method of claim 5 where said first material is uranium or its daughter products.

7. The method of claim 6 wherein said second and third materials are potassium, and thorium or its daughter products.

8. The method of claim 1 wherein said determining of elemental concentrations is from said formation spectrum and said sensitivity matrix element sets for said first, said second, and said third spectra, and wherein said second and third matrix elements are corrected for borehole effects.

9. The method of claim 1 wherein said first material is potassium.

10. The method of claim 9 wherein said second and third materials are radioisotopes of uranium and thorium and their daughter products.

11. The method of claim 1 wherein said determining of anomalous deposition step is based on a comparison of a current and hisorical total natural gamma ray logs.

12. The method of claim 1 wherein said determining step utilizes the magnitude of the residual fitting error between the downhole spectrum and concentrations based on matrix elements derived for all three elements being uniformly distributed in the formation.

13. The method of claim 1 wherein said determining step uses a priori knowledge of anomalous deposition.

14. The method of claim 1 wherein said measurements are made and recorded continuously as a function of borehole depth.

15. The method of claim 1 wherein said anomalous deposition in said determination step utilizes a measurement of relative photoelectric attenuation of said observed downhole spectrum.

16. The method of claim 15 wherein variations in the photoelectrically sensitive casing ratio measurement $R_c$ are used to determine anomalous deposition.

17. The method of claim 16 wherein said first material is a radioisotope of uranium and its daughter products.

18. The method of claim 17 wherein said second and third materials are radioisotopes of potassium, and thorium and its daughter products.

19. The method of claim 16 wherein the borehole region in which the measurement is made contains a casing and first material is deposited on the inner casing surface, the outer casing surface, or some combination thereof.

20. The method of claim 16 wherein said borehole contains a casing is surrounded by an annulus of cement and said first radioactive material is deposited within the borehole region.

21. The method of claim 20 where said first material is uranium or its daughter products.

22. The method of claim 21 where said second and third materials the potassium, and thorium or its daughter products.

23. The method of claim 16 wherein said determining of elemental concentrations is from said formation spectrum and said sensitivity matrix element sets for said first, said second, and said third spectra, and wherein said second and third matrix elements are corrected for borehole effects.

24. The method of claim 16 wherein said first material is potassium.

25. The method of claim 24 wherein said second and third materials are radioisotopes of uranium and thorium and their daughter products.

26. The methods of claim 16 wherein said determining of anomalous deposition step is based on a comparison of a current and historical total natural gamma ray logs.

27. The method of claim 16 wherein said determining step utilizes the magnitude of the residual fitting error between the downhole spectrum and concentrations based on matrix elements derived for all three elements being uniformly distributed in the formation.

28. The method of claim 16 wherein said determining step uses a priori knowledge of anamolous deposition.

29. The method of claim 16 wherein variations in the photoelectrically sensitive casing ratio measurement $R_c$ are used to determine anomalous deposition.

30. The method of claim 15 wherein variations in photoelectrically-sensitive quantities are used to determine the proportion of anomalous deposition inside the casing.

31. The method of claim 30 which uses the residual fitting error in an iterative fashion to determine the proportions of anomalous deposition outside the casing.

32. The method of claim 31 wherein said first material is a radioisotope of uranium and its daughter products.

33. The method of claim 32 wherein said second and third materials are radioisotopes of potassium, and thorium and its daughter products.

34. The method of claim 31 wherein the borehole region in which the measurement is made contains a casing and first material is deposited on the inner casing surface, the outer casing surface, or some combination thereof.

35. The method of claim 31 wherein said borehole contains a casing surrounded by an annulus of cement and said first radioactive material is deposited within the borehole region.

36. The method of claim 35 where said first material is uranium or its daughter products.

37. The method of claim 36 where said second and third materials are potassium, and thorium or its daughter products.

38. The method of claim 31 wherein said determining of elemental concentrations is from said formation spectrum and said sensitivity matrix element sets for said first, said second, and said third spectra, and wherein said second and third matrix elements are corrected for borehole effects.

39. The method of claim 31 wherein said first material is potassium.

40. The method of claim 39 wherein said second and third materials are radioisotopes of uranium and thorium and their daughter products.

41. The method of claim 31 wherein said determining of anomalous deposition step is based on a comparison of a current and historical total natural gamma ray logs.

42. The method of claim 31 wherein said determining step utilizes the magnitude of the residual fitting error between the downhole spectrum and concentrations based on matrix elements derived for all three elements being uniformly distributed in the formation.

43. The method of claim 31 wherein said determining step uses a prior knowledge of anomalous deposition.

44. The method of claim 31 wherein variations in the photoelectrically sensitive casing ratio measurement $R_c$ are used to determine anomalous deposition.

45. A method for compensating for anomalous radioactive deposition in the region of a borehole in determining subsurface earth formation natural radioactivity elemental concentrations, comprising:

measuring a first reference spectrum of a first radioactive material simulating deposiition of said first material in the borehole region;

measuring second, third and fourth reference spectra simulating deposition of second, third and fourth radioactive materials in the said formation, respectively;

deriving a set of elemental determination sensitivity matrix elements based on each of said first, second, third and fourth reference spectra;

measuring from within said borehole a downhole natural gamma ray energy spectrum of gamma rays originating in and traversing said borehole and formation;

determining a condition of anomalous deposition of said first material in said borehole region; and calculating compensated elemental concentrations of said first, second, third and fourth materials from said downhole gamma ray spectrum, and said sensitivity matrix element sets for said first, second, third and fourth materials.

46. The method of claim 45 wherein said first and third materials are radioisotopes of uranium and its daughter products.

47. The method of claim 46 wherein said second and fourth materials are radioisotopes of potassium, and thorium and its daughter products.

48. The method of claim 45 wherein the borehole region in which the measurement is made contains a casing and first material is deposited on the inner casing surface, the outer casing surface, or some combination thereof.

49. The method of claim 45 wherein said borehole contains a casing surrounded by an annulus of cement and said first radioactive material is deposited within the borehole region.

50. The method of claim 49 where said first and third materials are uranium or its daughter products.

51. The method of claim 50 where said second and fourth materials are potassium, and thorium or its daughter products.

52. The method of claim 45 wherein said determining of elemental concentrations is from said formation spectrum and said sensitivity matrix element sets for said first, said second, said third and said fourth spectra, and wherein said second third and fourth matrix elements are corrected for borehole effects.

53. The method of claim 45 wherein said first material is potassium.

54. The method of claim 53 wherein said second, third and fourth materials are radioisotopes of potassium and of uranium and thorium and their daugther products.

55. The method of claim 45 wherein said determining of anomalous deposition step is based on a comparison of a current and historical total natural gamma ray logs.

56. The method of claim 45 wherein said determining step utilizes the magnitude of the residual fittin error between the downhole spectrum and concentrations based on matrix elements derived for all three elements being uniformly distributed in the formation.

57. The method of claim 45 wherein said determining step uses a priori knowledge of anomalous deposition.

58. The method of claim 45 wherein said measurements are made and recorded continuously as a function of borehole depth.

59. The method of claim 45 wherein said anomalous deposition in said determination step utilizes a measurement of relative photoelectric attenuation of said observed downhole spectrum.

60. The method of claim 59 wherein variations in the photoelectrically sensitive casing ratio mmasurement $R_c$ are used to determine anomalous deposition.

* * * * *